United States Patent Office 3,706,774
Patented Dec. 19, 1972

3,706,774
STANNOUS GLYCOLOXIDES
Melvin Hyman Gitlitz, Edison, N.J., assignor to M & T Chemicals Inc., Greenwich, Conn.
No Drawing. Filed Feb. 2, 1971, Ser. No. 112,045
Int. Cl. C07f 7/22
U.S. Cl. 260—429.7        8 Claims

ABSTRACT OF THE DISCLOSURE

This invention concerns novel polymeric stannous glycoloxides wherein the repeating unit exhibits the formula

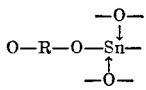

and a method for preparing these compounds.

BACKGROUND OF THE INVENTION

The present invention relates to polymeric stannous glycoloxides. This invention further relates to the preparation of these compounds by reacting the corresponding glycol with stannous oxide.

It is known that many stannous compounds are effective catalysts for the preparation of high molecular weight polyesters using glycol esters, e.g. bis($\beta$-hydroxyethyl) terephthalate as starting materials. The polymerization is preferably conducted at elevated temperatures and pressures to obtain a useful rate of reaction. Some otherwise effective catalysts undergo degradation at the temperatures employed during polymerization and subsequent shaping of the melted polymer. Even at very low concentrations the decomposition products impart a color to the polymer, making it unsuitable for many end uses.

An object of the present invention is to provide thermally stable stannous compounds containing tin-oxygen bonds.

Another object of this invention is to provide a method for preparing thermally stable tin-containing polyesterification catalysts from inexpensive, readily available starting materials.

SUMMARY OF THE INVENTION

One aspect of the present invention concerns novel polymeric stannous glycoloxides wherein the repeating unit exhibits the general structure

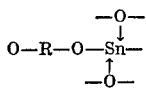

R being selected from the group consisting of divalent aliphatic hydrocarbon radicals with the proviso that both valences are not located on the same carbon atom and wherein at least a portion of the repeating units are associated with one or more adjacent repeating units by means of coordination bonds, represented by arrows, between tin and oxygen.

A second aspect of this invention concerns a method for preparing polymeric stannous glycoloxides by reacting anhydrous or hydrated stannous oxide and a glycol (i.e. a dihydric alcohol) for a period of time sufficient to effect a substantially complete reaction and subsequently recovering the resultant solid polymeric stannous glycoloxide.

DETAILED DESCRIPTION OF THE INVENTION

To increase the rate of formation of the desired stannous glycoloxide the reaction between the glycol and stannous oxide (SnO) is preferably carried out at elevated temperature, most preferably at the reflux temperature i.e. boiling point of the glycol. The advantage of employing the reflux temperature is that water, generated as a by-product of the reaction, can readily be removed from the reaction mixture using a suitable distillation apparatus.

Since stannous oxide is virtually insoluble in the glycol, it is desirable to obtain the largest possible area of contact between liquid and solid phases. This can be accomplished by employing either a finely divided form of the oxide or larger oxide particles with at least one major surface that is preferably irregular in contour. Both the anhydrous and hydrated forms of stannous oxide are suitable; however, it appears that the anhydrous form of the oxide reacts more rapidly than the hydrated form. The hydrated oxide requires the presence of a catalyst (e.g. copper powder) to obtain a reaction rate which is slower than that for an uncatalyzed reaction using the anhydrous form of the oxide.

Glycols that are suitable for use in preparing the polymeric stannous glycoloxides of this invention contain between 2 and about 6 carbon atoms and correspond to the formula HO–R–OH, wherein R represents a divalent hydrocarbon radical that may contain one or more inert substituents (e.g. halide or alkoxy radicals) with the proviso that both hydroxyl groups are not bonded to the same carbon atom. The quantity of glycol employed is preferably in large excess of the stoichiometric amount required for complete reaction with the stannous oxide. The glycol, therefore, serves both as reactant and diluent, eliminating the need for additional diluents which must eether be disposed of or recovered and purified following completion of the reaction. The use of an inert diluent may be desirable to reduce the relatively high viscosity exhibited by higher molecular weight glycols even at elevated temperature. The high viscosity would make it difficult to achieve appreciable heat transfer and the desired mixing action between liquid and solid phases.

The lack of sufficient heat transfer could result in localized overheating and discoloration of the glycol. The diluent should exhibit a relatively high boiling point, preferably above 180° C. Examples of suitable diluents are diethyl carbitol, carbitol acetate, and diphenylether. A mixture comprising 2 or more glycols can be employed in the present method if so desired.

The time required for substantially complete reaction appears to be directly related to the molecular weight of the glycol and inversely proportional to the reaction temperature. Using refluxing ethylene glycol, a complete reaction, as indicated by the disappearance of the characteristic blue color of anhydrous stannous oxide, requires about four hours. Under similar conditions decolorization of a reaction mixture containing 1,2-propanediol requires about 8 days.

The stannous glycoloxides are substantially insoluble in the corresponding glycols at ambient temperature and can be readily isolated by filtering the reaction mixture. Stannous gylcoloxides exhibit excellent thermal stability. Stannous ethylene glycoloxide does not melt at temperatures of up to 300° C., at which temperature only a silght amount of charring is observed. The combination of good thermal stability and the insolubility of these compounds in a variety of polar and non-polar solvents is characteristic of cross-linked polymers. While the structure of the products has not been definitely established, it is believed that they can be described as polymers wherein the repeating units exhibit the general formula

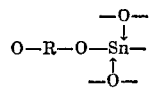

R is selected from the group of divalent aliphatic hydrocarbon radicals as hereinbefore defined, with the proviso that both valences are not located on the same carbon atom. At least a portion of the repeating units are associated with adjacent units by means of coordination bonds between tin and oxygen atoms, represented by arrows in the foregoing structural formula. In the +2 (stannous) valence state, tin exhibits a coordination number of 3 or 4. The resultant cross-linked structure would account for the physical properties that characterize the glycoloxides of this invention.

As disclosed hereinbefore, the process of this invention can be applied to a mixture of glycols, in which instance the divalent hydrocarbon radical R in the preceeding structural formula for the repeating unit would represent hydrocarbon residues from each of the component glycols.

The stannous glycoloxides of this invention are useful as catalysts for the polycondensation of glycol esters (e.g. bis(β-hydroxyethyl) terephthalate) to form high molecular weight polyesters. The use of tin alcoholates in this application is disclosed un USP 2,720,507. The thermal stability of the glycoloxides would reduce, if not eliminate, discoloration of the polymer resulting from decomposition of the catalyst at the relatively high temperatures employed during the polycondensation step and subsequent extension of the polymer melt to form shaped articles, e.g. filaments.

The following examples demonstrate preferred embodiments of this invention and should not be interpreted as limiting the scope thereof.

EXAMPLE 1

This example demonstrates the preparation of stannous ethylene glycoloxide. The reaction vessel was equipped with a stirrer, a thermometer for the measurement of vapor temperature, a reflux condenser and a distillation head which permitted the removal of part or all of the liquid returning from the reflux condenser to the reaction mixture. After charging the reaction vessel with 100 g. of anhydrous (blue-black) stannous oxide and 400 cc. of ethylene glycol, the resultant two-phase mixture was heated to reflux temperatures (196° C.). The temperature of the vapor gradually decreased due to the evolution of water vapor, a by-product of the reaction. The vapor temperature was maintained above 190° C. by drawing off portions of the refluxing liquid, which consisted of a glycol-water mixture. After about four hours the vapor temperature remained constant at 196° C., indicating that evolution of water had ceased. During this time 100 cc. of glycol had been added to the reaction mixture to replace material removed. Heating of the reaction mixture was continued for about an additional hour, after which time it was allowed to cool to ambient temperature. The solid material was filtered, washed two times with tetrahydrofuran, then dried under reduced pressure at room temperature.

The yield of stannous ethylene glycoloxide was 129.5 g. The product exhibited the following analysis by weight:

|  | Percent | |
|---|---|---|
|  | Calculated | Found |
| Sn total | 66.4 | 66.56 |
| $Sn^{+2}$ | 66.4 | 65.83 |
| C | 13.42 | 13.38 |
| H | 2.24 | 2.15 |

EXAMPLE 2

This example demonstrates the preparation of stannous 1,2-propylene glycoloxide.

The procedure and apparatus of Example 1 were employed using 100 g. of anhydrous stannous oxide and 400 cc. of 1,2-propylene glycol. Eight days at reflux temperature were required before a constant vapor temperature of 185° C. could be maintained over a period of three hours without having to draw off any of the refluxing liquid. A total of 223.0 g. of liquid was removed.

The viscosity of the final reaction mixture was reduced by adding 500 cc. of tetrahydrofuran, after which the solid material was removed by filtration, washed with 1000 cc. of tetrahydrofuran, and dried for two hours in an oven under reduced pressure. The dried material was passed through a 70 mesh sieve to remove adhering filter paper and about 0.5 g. of dark-colored lumps. The resultant white powder weighed 132. g. and exhibited the following analysis:

|  | Percent | |
|---|---|---|
|  | Calculated | Found |
| Sn total | 61.6 | 61.56 |
| $Sn^{+2}$ | 61.6 | 60.44 |
| C | 18.7 | 18.67, 18.78 |
| H | 2.62 | 3.26, 3.12 |

Although this invention has been illustrated by reference to specific examples, numerous changes and modifications thereof which clearly fall within the scope of the invention will be apparent to those skilled in the art.

I claim:

1. A polymeric stannous glycoloxide wherein the repeating unit represented by the formula

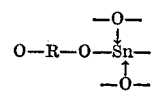

R represents a divalent hydrocarbon radical containing between 2 and 6 carbon atoms which may be inertly substituted, with the proviso that both valences are not located on the same carbon atom of said radical, and ↑ represents a coordination between the tin atom and an oxygen atom of an adjacent repeating unit of said stannous glycoloxide.

2. The polymeric stannous glycoloxide of claim 1 wherein R represents an ethylene radical.

3. The polymeric stannous glycoloxide of claim 1 wherein R represents a 1,2-propylene radical.

4. A process for preparing a polymeric stannous glycoloxide comprising reacting stannous oxide with a glycol containing between 2 and 6 carbon atoms and subsequently recovering the solid stannous glycoloxide.

5. The process of claim 4 wherein the reaction between stannous oxide and the glycol is carried out at a temperature above about 100° C.

6. The process of claim 4 wherein the reaction is carried out at the reflux temperature of the reaction mixture.

7. The process of claim 4 wherein the glycol is selected from the group consisting of ethylene glycol and 1,2-propylene glycol.

8. The process of claim 4 wherein the stannous oxide is substantially anhydrous.

References Cited

UNITED STATES PATENTS 3,248,347   4/1966   Gurgiolo _____ 260—429.7

DANIEL E. WYMAN, Primary Examiner

W. F. W. BELLAMY, Assistant Examiner